United States Patent
Ahn et al.

(10) Patent No.: US 9,338,770 B2
(45) Date of Patent: *May 10, 2016

(54) METHOD AND APPARATUS FOR MITIGATING INTERFERENCE IN A WIRELESS COMMUNICATION SYSTEM SUPPORTING HETEROGENEOUS NETWORKS

(71) Applicant: LG ELECTRONICS INC., Seoul (KR)

(72) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,582

(22) Filed: Apr. 16, 2014

(65) Prior Publication Data

US 2014/0226590 A1    Aug. 14, 2014

Related U.S. Application Data

(63) Continuation of application No. 13/388,258, filed as application No. PCT/KR2010/008160 on Nov. 18, 2010.

(60) Provisional application No. 61/266,107, filed on Dec. 2, 2009.

(30) Foreign Application Priority Data

Sep. 10, 2010    (KR) ........................ 10-2010-0088796

(51) Int. Cl.
*H04W 72/00* (2009.01)
*H04W 72/04* (2009.01)

(Continued)

(52) U.S. Cl.
CPC ......... *H04W 72/0413* (2013.01); *H04J 11/005* (2013.01); *H04W 74/0833* (2013.01)

(58) Field of Classification Search
CPC .......... H04W 72/0406; H04W 72/042; H04W 24/10; H04W 36/0083; H04W 48/08
USPC ................ 455/436, 423, 522, 450, 501, 3.01, 455/452.1, 524, 517, 552.1, 67.13, 63.1, 455/68; 370/329, 335, 328
See application file for complete search history.

(56) References Cited

U.S. PATENT DOCUMENTS 8,103,297 B2    1/2012    Aiba et al.
8,170,043 B2    5/2012    On et al.

(Continued)

OTHER PUBLICATIONS

Huawei, "LTE-Advanced Scenarios in Heterogeneous Network", R3-091780, 3GPP TSG RAN WG3 #65, Shenzhen, China, Aug. 2009, 3 pages.

(Continued)

*Primary Examiner* — Joseph Arevalo
(74) *Attorney, Agent, or Firm* — Birch, Stewart, Kolasch & Birch, LLP

(57) ABSTRACT

A method and apparatus for receiving signals at a base station (BS) in a wireless communication system supporting a plurality of cells including a first cell and a second cell. The method includes receiving first uplink control information via a first physical uplink control channel (PUCCH) from a first user equipment (UE); and receiving second uplink control information via a second PUCCH from a second UE. The first PUCCH is carried only on the first cell. The second PUCCH is carried only on the second cell. The first cell is different from the second cell.

8 Claims, 7 Drawing Sheets

(51) Int. Cl.
*H04J 11/00* (2006.01)
*H04W 74/08* (2009.01)

(56) References Cited

U.S. PATENT DOCUMENTS

| | | | |
|---|---|---|---|
| 8,351,974 B2 | 1/2013 | Ahn et al. | |
| 8,432,859 B2 * | 4/2013 | Lee et al. | 370/329 |
| 8,483,698 B2 * | 7/2013 | Papasakellariou et al. | 455/450 |
| 2006/0014554 A1 | 1/2006 | Gerlach | |
| 2006/0165032 A1 | 7/2006 | Hamalainen et al. | |
| 2007/0061151 A1 | 3/2007 | Groskreutz et al. | |
| 2009/0135787 A1 * | 5/2009 | Uemura et al. | 370/335 |
| 2009/0279495 A1 | 11/2009 | Yoo | |
| 2009/0290538 A1 | 11/2009 | Kim et al. | |
| 2010/0008294 A1 * | 1/2010 | Palanki et al. | 370/328 |
| 2010/0008317 A1 * | 1/2010 | Bhattad et al. | 370/329 |
| 2010/0195575 A1 * | 8/2010 | Papasakellariou et al. | 370/328 |
| 2010/0195702 A1 * | 8/2010 | Nakao et al. | 375/140 |
| 2010/0232385 A1 | 9/2010 | Hsu | |
| 2010/0271970 A1 | 10/2010 | Pan et al. | |
| 2010/0296454 A1 | 11/2010 | Park et al. | |
| 2010/0311431 A1 | 12/2010 | Papasakellariou et al. | |
| 2010/0322171 A1 | 12/2010 | Dekorsy et al. | |
| 2010/0322227 A1 | 12/2010 | Luo | |
| 2011/0044269 A1 * | 2/2011 | Fan et al. | 370/329 |
| 2011/0081932 A1 * | 4/2011 | Astely et al. | 455/509 |
| 2011/0098074 A1 | 4/2011 | Seo et al. | |
| 2011/0111779 A1 * | 5/2011 | Krishnamurthy et al. | 455/501 |
| 2011/0237270 A1 | 9/2011 | Noh et al. | |
| 2011/0299489 A1 * | 12/2011 | Kim et al. | 370/329 |
| 2012/0015622 A1 | 1/2012 | Kuz et al. | |
| 2012/0140708 A1 | 6/2012 | Choudhury et al. | |
| 2013/0182679 A1 | 7/2013 | Seo et al. | |

OTHER PUBLICATIONS

Motorola, "Macro-cell uplink interference to HeNBs," 3GPP TSG-RAN WG4 Meeting #51bis, R4-092400, Los Angeles, USA, Jun. 29-Jul. 2, 2009, 6 pages.

Motorola, "Reliable Downlink Control for Heterogeneous Networks," 3GPP TSG RAN1 #58bis, R1-093971, Miyazaki Japan, Oct. 12-16, 2009, pp. 1-7.

Philips, "Mitigation of Control Channel Interference", R1-102252, 3GPP TSG RAN WG1 meeting #60bis, Beijing, China, Apr. 2010, 4 pages.

Seminar Ausgewähite Kapitel der Nachrichtentechnik, WS 2009/2010, LTE: Der Mobilfunk der Zukunft, Random Access, Almamy Touray, Dec. 2, 2009, pp. 1-12.

* cited by examiner

METHOD AND APPARATUS FOR MITIGATING INTERFERENCE IN A WIRELESS COMMUNICATION SYSTEM SUPPORTING HETEROGENEOUS NETWORKS

CROSS-REFERENCE TO RELATED APPLICATIONS

This application is a continuation of U.S. patent application Ser. No. 13/388,258 filed Jan. 31, 2012, which is the National Phase of PCT/KR2010/008160 filed on Nov. 18, 2010, which claims priority under 35 U.S.C. 119 (e) to U.S. Provisional Application No. 61/266,107 filed on Dec. 2, 2009 and under 35 U.S.C. 119 (a) to Patent Application No. KR-10-2010-0088796 filed in the Republic of Korea on Sep. 10, 2010. The entire contents of all these applications are hereby expressly incorporated by reference into the present application

BACKGROUND OF THE INVENTION

1. Field of the Invention

The present invention relates to a wireless communication system, and more particularly, to a method and apparatus for mitigating interference in a wireless communication system supporting heterogeneous networks.

2. Discussion of the Related Art

With reference to FIG. 1, a frame structure for a wireless communication system will first be described. FIG. 1 illustrates a frame structure for a Long Term Evolution (LTE) system. Referring to FIG. 1, a frame includes 10 subframes, each subframe having 2 slots. Time taken to transmit one subframe is called a Transmission Time Interval (TTI). For example, one subframe may be 1 ms long and one slot may be 0.5 ms long.

One slot includes a plurality of Orthogonal Frequency Division Multiplexing (OFDM) symbols. An OFDM symbol may also be called a Single Carrier-Frequency Division Multiple Access (SC-FDMA) symbol or a symbol period.

One slot includes 7 or 6 OFDM symbols depending on the length of a Cyclic Prefix (CP). In the LTE system, a normal CP and an extended CP are defined. One slot includes 7 OFDM symbols in the case of a normal CP, whereas one slot includes 6 OFDM symbols in the case of an extended CP.

FIG. 2 illustrates the resource structure of one downlink slot. Herein, a slot includes 7 OFDM symbols. A Resource Element (RE) is a resource area occupying one OFDM symbol by one subcarrier, and a Resource Block (RB) is a resource area occupying a plurality of OFDM symbols by a plurality of subcarriers. For instance, an RB may include 7 OFDM symbols in time by 12 subcarriers in frequency. The number of RBs per slot may be determined according to a downlink bandwidth.

FIG. 3 illustrates a downlink subframe structure. Referring to FIG. 3, up to three first OFDM symbols in the first slot of a subframe correspond to a control region to which a control channel is allocated. The other OFDM symbols correspond to a data region to which a Physical Downlink Shared Channel (PSCH) is allocated.

In the 3$^{rd}$ Generation Partnership Project (3GPP) LTE system, downlink control channels include a Physical Control Format Indicator Channel (PCFICH), a Physical Downlink Control Channel (PDCCH), and a Physical Hybrid automatic repeat request Indicator Channel (PHICH).

The PCFICH is transmitted in the first OFDM symbol of a subframe, carrying information about the number of OFDM symbols used for transmission of control channels in the subframe. The PHICH delivers an ACKnowledgment/Negative ACKnowledgment (ACK/NACK) signal as a response to uplink transmission. Control information transmitted on the PDCCH is called Downlink Control Information (DCI). The DCI includes uplink scheduling information, downlink scheduling information, or an uplink transmit power control command for a User Equipment (UE).

Now a description will be given of carrier aggregation in an LTE-Advanced (LTE-A) system with reference to FIG. 4.

FIG. 4($a$) illustrates a single carrier structure and FIG. 4($b$) illustrates a multi-carrier structure.

As there has been an increasing demand for high data rates, studies have been conducted on carrier aggregation. Referring to FIG. 4($b$), a UE may simultaneously receive downlink signals on multiple carriers. However, even when a Base Station (BS) manages N downlink Component Carriers (CCs), the BS may allocate M downlink CCs to a UE so that the UE monitors signals on the M downlink CCs. Herein, M is equal to or less than N. The BS may also allocate L CCs as primary CCs to the UE so that the UE monitors signals on the L CCs with priority. L is equal to or less than M.

If UEs of heterogeneous networks communicate with a BS in the same frequency band in a heterogeneous network environment, interference may occur. For example, in the case where a femtocell BS is installed within the coverage of a macro BS, if UE A near to a femtocell managed by the femtocell BS communicates with the femtocell BS and UE B near to UE A communicates with the macro BS in the same frequency band as UE A, a signal that UE B transmits to the macro BS interferes with UE A. Especially, considering that the Modulation and Coding Scheme (MCS) level of a Physical Uplink Control Channel (PUCCH) is not changed much, it is difficult to decrease the power of a control channel transmitted by UE A. Accordingly, the PUCCH transmitted by UE A may interfere with the femtocell significantly.

SUMMARY OF THE INVENTION

As described above, interference may occur in a heterogeneous network environment.

An object of the present invention devised to solve the problem lies on a method for mitigating interference in a heterogeneous network environment.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for mitigating interference at a BS of a first network in a wireless communication system supporting carrier aggregation, including the first network and a second network, the method including generating information indicating whether each of uplink component carriers is used for transmission of control information in the first network, and transmitting the information to a UE. A component carrier used for transmission of control information in the first network is different from a component carrier used for transmission of control information in the second network.

The information may indicate a set of component carriers not used for transmission of control information in the first network.

The information may indicate a set of component carriers used for transmission of control information in the first network.

The BS may receive from the UE Uplink Control Information (UCI) piggybacked to Physical Uplink Shared Channels (PUSCH) of the component carriers used for transmission of control information in the first network.

The BS may receive from the UE Physical Random Access Channels (PRACH) on the component carriers used for transmission of control information in the first network.

In another aspect of the present invention, provided herein is a method for mitigating interference at a UE of a first network in a wireless communication system supporting carrier aggregation, including the first network and a second network, the method including receiving from a BS information indicating whether each of uplink component carriers is used for transmission of control information in the first network, and transmitting to the BS uplink control information on at least one component carrier used for transmission of control information according to the received information. A component carrier used for transmission of control information in the first network is different from a component carrier used for transmission of control information in the second network.

In another aspect of the present invention, provided herein is a BS of a first network in a wireless communication system supporting carrier aggregation, including the first network and a second network, which includes a processor for generating information indicating whether each of uplink component carriers is used for transmission of control information in the first network, and a transmission module for transmitting the information to a UE. A component carrier used for transmission of control information in the first network is different from a component carrier used for transmission of control information in the second network.

In another aspect of the present invention, provided herein is a UE of a first network in a wireless communication system supporting carrier aggregation, including the first network and a second network, which includes a reception module for receiving from a BS information indicating whether each of uplink component carriers is used for transmission of control information in the first network, and a transmission module for transmitting to the BS uplink control information on at least one component carrier used for transmission of control information according to the received information. A component carrier used for transmission of control information in the first network is different from a component carrier used for transmission of control information in the second network.

In a further aspect of the present invention, provided herein is a method for mitigating interference at a BS of a first network in a wireless communication system supporting carrier aggregation, including the first network and a second network, the method including determining for a first UE a set of component carriers not used for transmission of control information among uplink component carriers, and notifying the first UE of the determined set of component carriers. The determined component carriers are used for transmission of control information in the second network interfered by the first UE.

According to embodiments of the present invention, interference can be mitigated in a heterogeneous network environment.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project Long Term Evolution-Advanced (3GPP LTE-A) is being used. However, the description is applicable to any other mobile communication system except for specific features inherent to the 3GPP LTE-A system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced MS (AMS), etc. and the term 'Base Station (BS)' is assumed to refer to any node of a network end, such as a Node B, an enhanced Node B (eNB or eNode B), an Advanced BS (ABS), etc., communicating with a UE.

Signal transmission in a heterogeneous network environment will be described below with reference to FIGS. 5 and 6.

Figure 1:
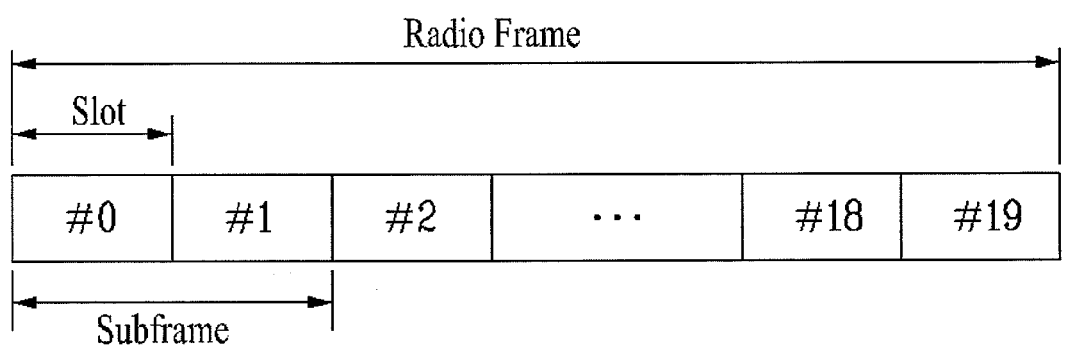
FIG. 1 illustrates a frame structure for a Long Term Evolution (LTE) system.
Figure 2:
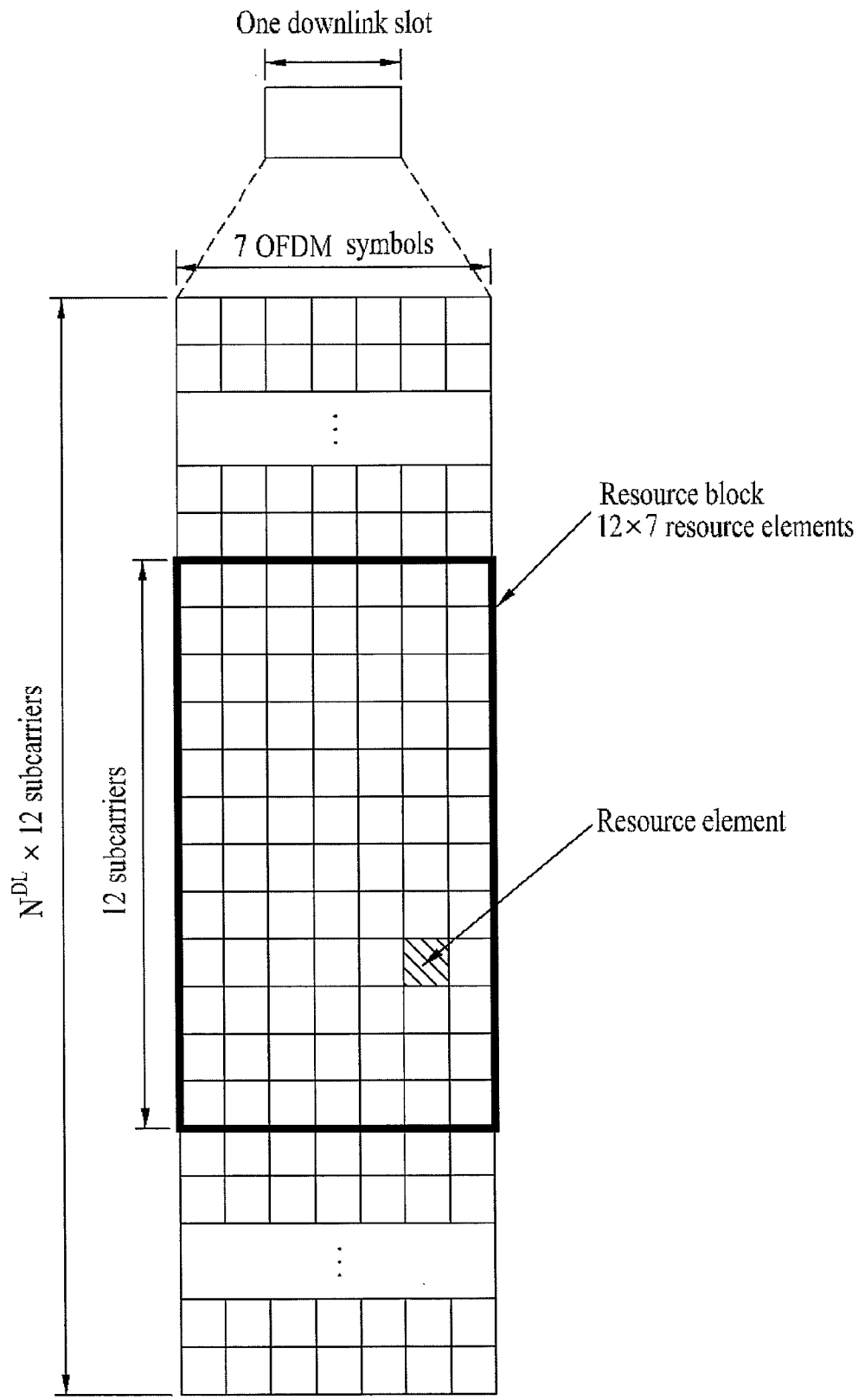
FIG. 2 illustrates the resource structure of one downlink slot.
Figure 3:
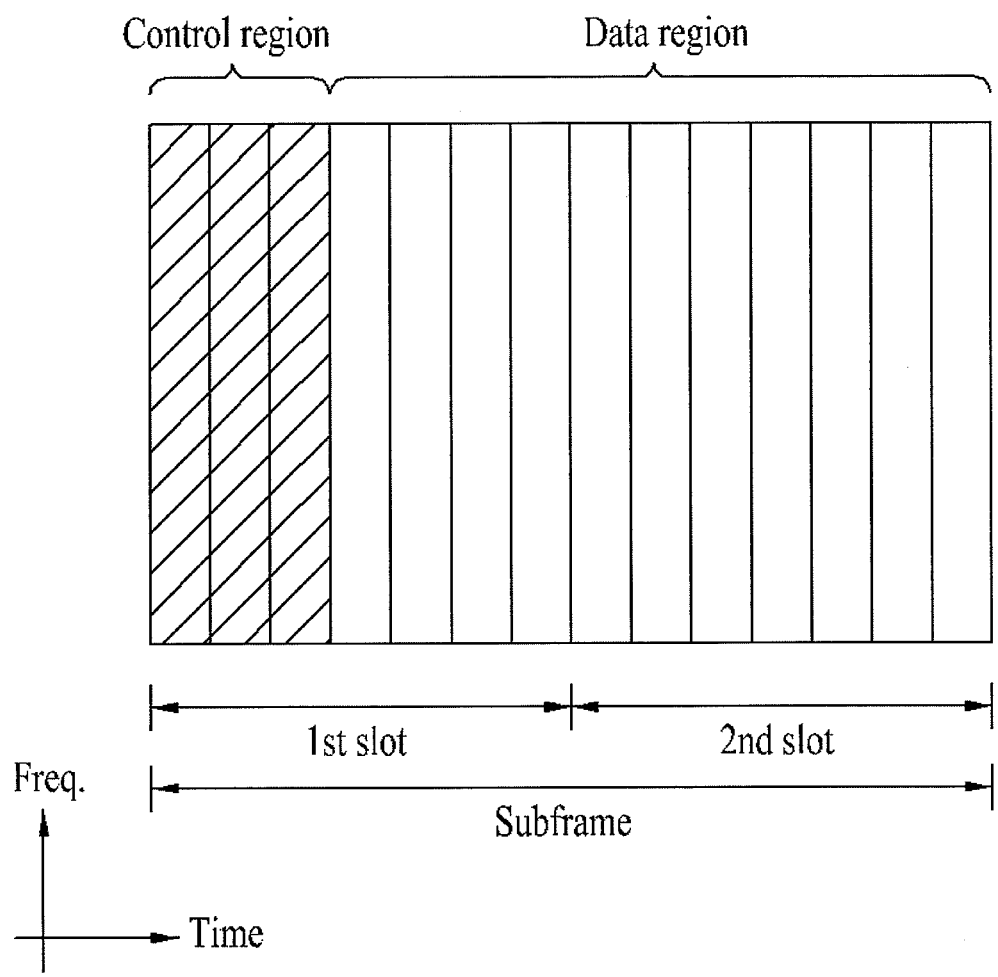
FIG. 3 illustrates a downlink subframe structure.
Figure 4:
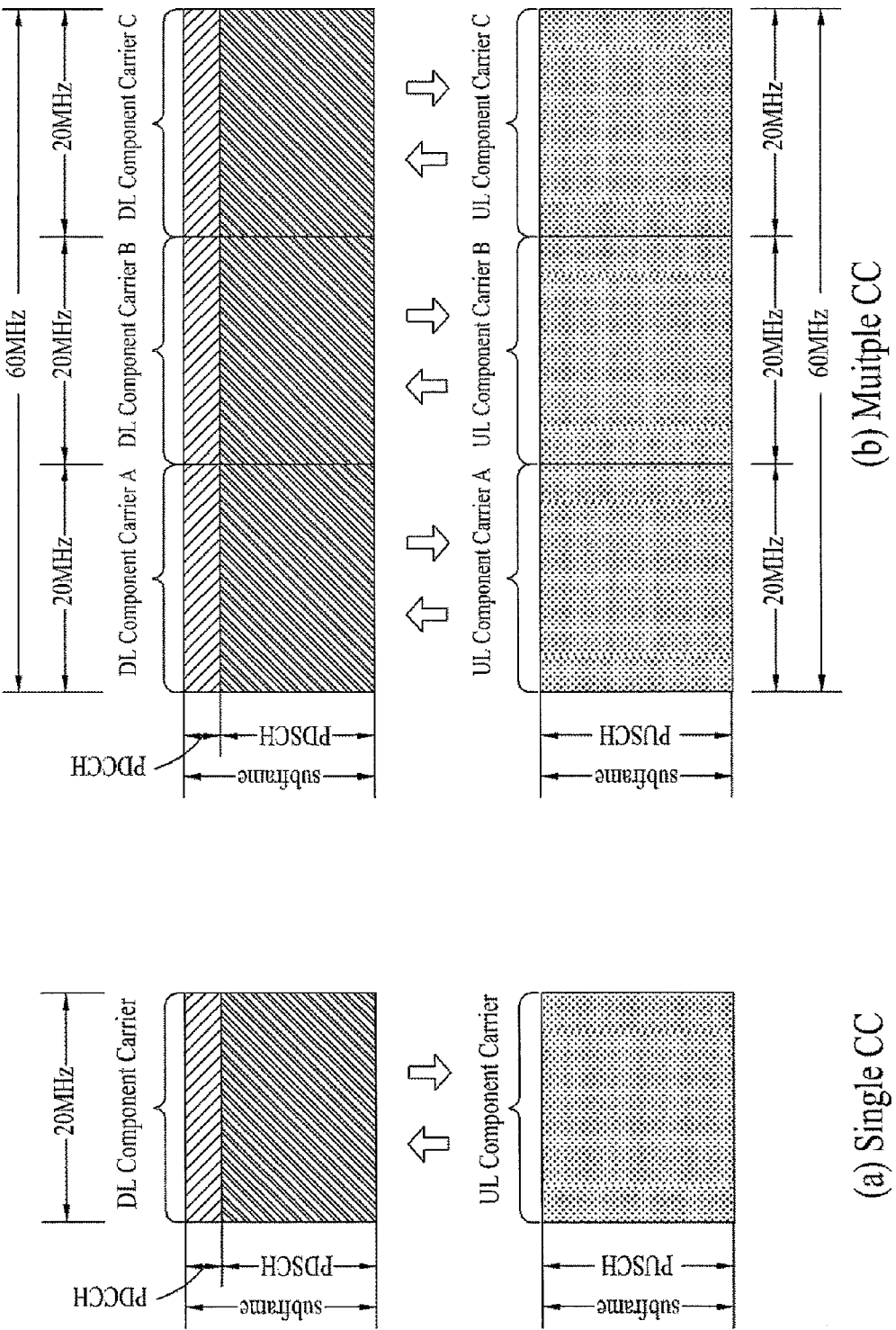
FIG. 4($a$) illustrates a single carrier structure and FIG. 4($b$) illustrates a multi-carrier structure.
Figure 5:
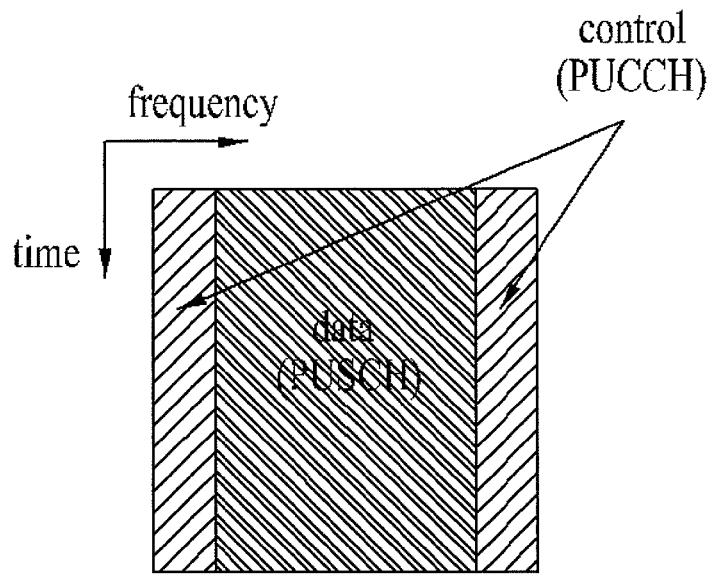
FIG. 5 illustrates transmission of a Physical Uplink Control Channel (PUCCH) and a Physical Uplink Shared Channel (PUSCH) on an uplink Component Carrier (CC).

FIG. 5 illustrates transmission of a Physical Uplink Control Channel (PUCCH) and a Physical Uplink Shared Channel (PUSCH) on an uplink CC. Referring to FIG. 5, the PUCCH and the PUSCH are transmitted in different frequency bands of the same uplink CC.

Figure 6:
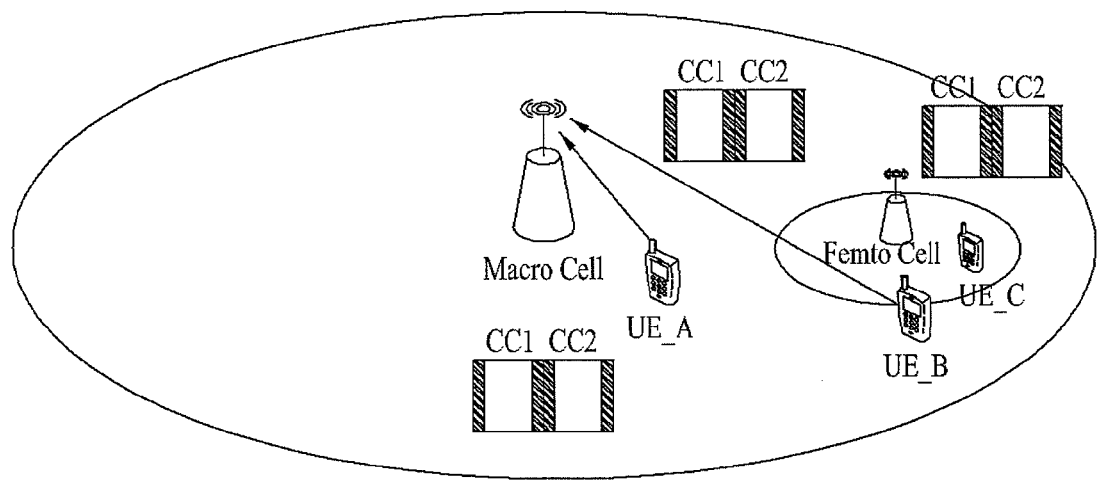
FIG. 6 illustrates deployment of a macrocell and a femtocell.

FIG. 6 illustrates deployment of a macrocell and a femtocell. Referring to FIG. 6, the femtocell is located within the coverage of the macrocell and two uplink CCs are used commonly in the femtocell and the macrocell. The femtocell covers a smaller area than the macrocell and services UEs near to a femto BS. Because the coverage of the macrocell is much larger than the femtocell, the transmit power of UE_B communicating with a macro BS is larger than the transmit power of UE_C communicating with the femto BS. Therefore, when UE_B is near to UE_C, the transmit power of UE_B may significantly interfere with signal transmission from UE_C.

The macro BS may control reduction of the transmit power of UE_B so that the transmit power of UE_B does not interfere much with the femtocell. If the transmit power of UE_B is decreased, the MCS level of a PUSCH may be adjusted to satisfy the reception performance of the PUSCH at the BS. However, it is difficult to decrease the transmit power of a PUCCH because the MCS level of the PUCCH does not change much. Thus PUCCHs transmitted by UEs communicating with the macro BS may cause a great interference with the femtocell.

Figure 7:
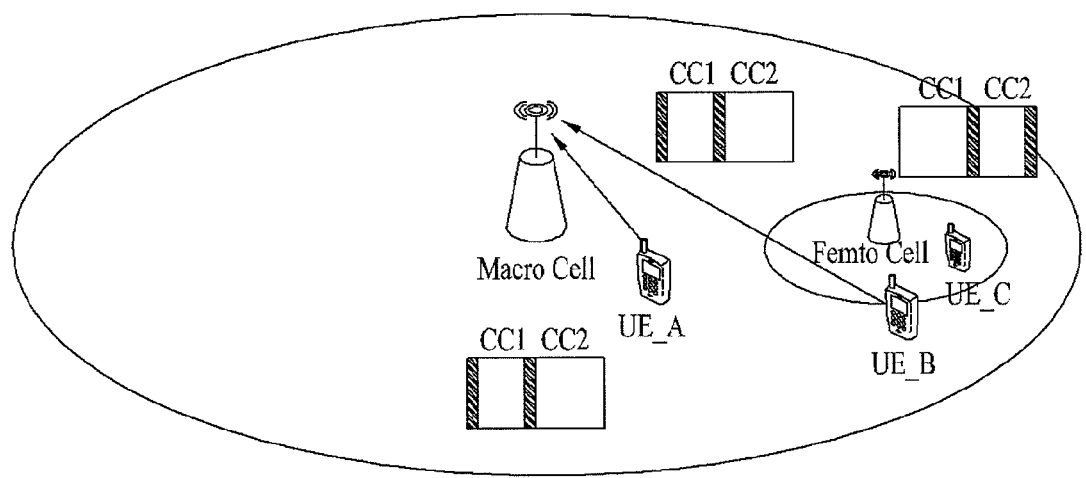
FIG. 7 illustrates a method for mitigating interference according to an embodiment of the present invention.

With reference to FIG. 7, a description will be given of a method for mitigating interference in a wireless communication system supporting heterogeneous networks according to an embodiment of the present invention.

FIG. 7 illustrates a method for mitigating interference according to an embodiment of the present invention. While a macro network and a femto network are taken as an example in this embodiment, to which the present invention is not limited, it is to be clearly understood that the present invention is applicable to any case in which heterogeneous networks are deployed.

According to the embodiment of the present invention, a BS generates information indicating whether each uplink CC is used for transmitting control information and transmits the information to UEs. Component Carriers (CCs) that are not used to transmit control information are referred to as a PUCCH-less CC set and CCs used to transmit control information are referred to as a PUCCH transmission CC set.

Referring to FIG. 7, a first CC (CC1) is a PUCCH-less CC for the femtocell and a second CC (CC2) is a PUCCH-less CC for the macrocell. On the other hand, CC2 is a PUCCH transmission CC for the femtocell and CC1 is a PUCCH transmission CC for the macrocell.

That is, different CCs serve as PUCCH transmission CCs in the femtocell and the macrocell.

Since the PUCCH transmission CC of the femtocell is the PUCCH-less CC of the macrocell, the macrocell may mitigate interference by decreasing the transmit power of the PUCCH transmission CC of the femtocell. That is, the macro BS may command UE_B to decrease the transmit power of CC2 in order to reduce interference in FIG. 7.

A PUCCH transmission CC set or a PUCCH-less CC set may be indicated by information indicating whether each uplink CC includes control information. That is, the macro BS may notify UEs of a PUCCH transmission CC set or a PUCCH-less CC set. To notify the UEs of the PUCCH transmission CC set or the PUCCH-less CC set, the macro BS may use a Broadcast Channel (BCH), common Radio Resource Control (RRC) signaling, or dedicated RRC signaling.

In addition, the macro BS may allocate uplink CCs and downlink CCs to UEs by dedicated RRC signaling.

A UE does not transmit an ACK/NACK for downlink data on a PUCCH-less CC. A PUSCH of a PUCCH-less CC is not piggybacked with Uplink Control Information (UCI). This is because the reception performance of UCI is not ensured due to low transmit power of a PUCCH-less CC. To prevent a Physical Random Access Channel (PRACH) transmitted at a high power level from causing interference, the PRACH may be prohibited from being transmitted on a PUCCH-less CC. In other words, the UCI may be piggybacked to a PUSCH of a PUCCH transmission CC and the PRACH may be transmitted on a PUCCH transmission CC.

Figure 8:
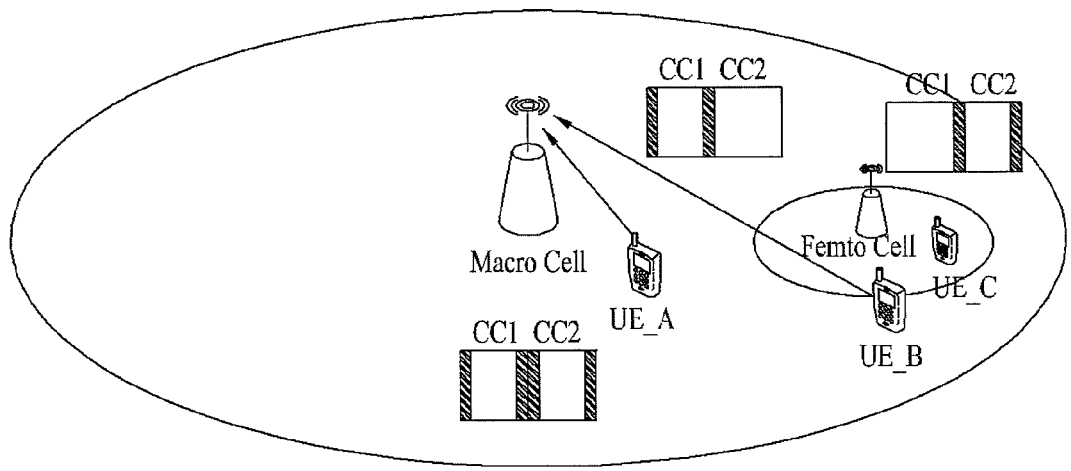
FIG. 8 illustrates a method for mitigating interference according to another embodiment of the present invention.

With reference to FIG. 8, a method for mitigating interference according to another embodiment of the present invention will be described below.

FIG. 8 illustrates a method for mitigating interference according to another embodiment of the present invention.

In accordance with this embodiment, a BS generates information indicating whether each uplink CC carries control information and transmits the information to UEs.

While a PUCCH-less CC set and a PUCCH transmission set are cell-specific in the embodiment illustrated in FIG. 7, a PUCCH-less CC set and a PUCCH transmission set may be UE-specific in the embodiment illustrated in FIG. 8.

Referring to FIG. 8, a first CC (CC1) serves as a PUCCH-less CC for UE_C and a second CC (CC2) serves as a PUCCH-less CC for UE_B. On the other hand, CC2 serves as a PUCCH transmission CC for UEC and CC1 serves as a PUCCH transmission CC for UE_B. Both CC1 and CC2 serve as PUCCH transmission CCs for UE_A. Because UE_A is far from the femtocell, transmission of control information on any CC from UE_A does not interfere with the femtocell. Therefore, UE_A is allowed to use all CCs as PUCCH transmission CCs. That is, the BS may determine a PUCCH-less CC and a PUCCH transmission CC for individual UEs.

This embodiment advantageously increases resource use flexibility because a PUCCH-less CC and a PUCCH transmission CC are determined on a UE basis.

Even though a PUCCH-less CC and a PUCCH transmission CC are determined on a UE basis, it may be regulated that UCI is not piggybacked to a PUSCH of a PUCCH-less CC and a PRACH is not transmitted on a PUCCH-less CC. In other worlds, the UCI may be piggybacked to a PUSCH of a PUCCH transmission CC and the PRACH may be transmitted on a PUCCH transmission CC.

Figure 9:
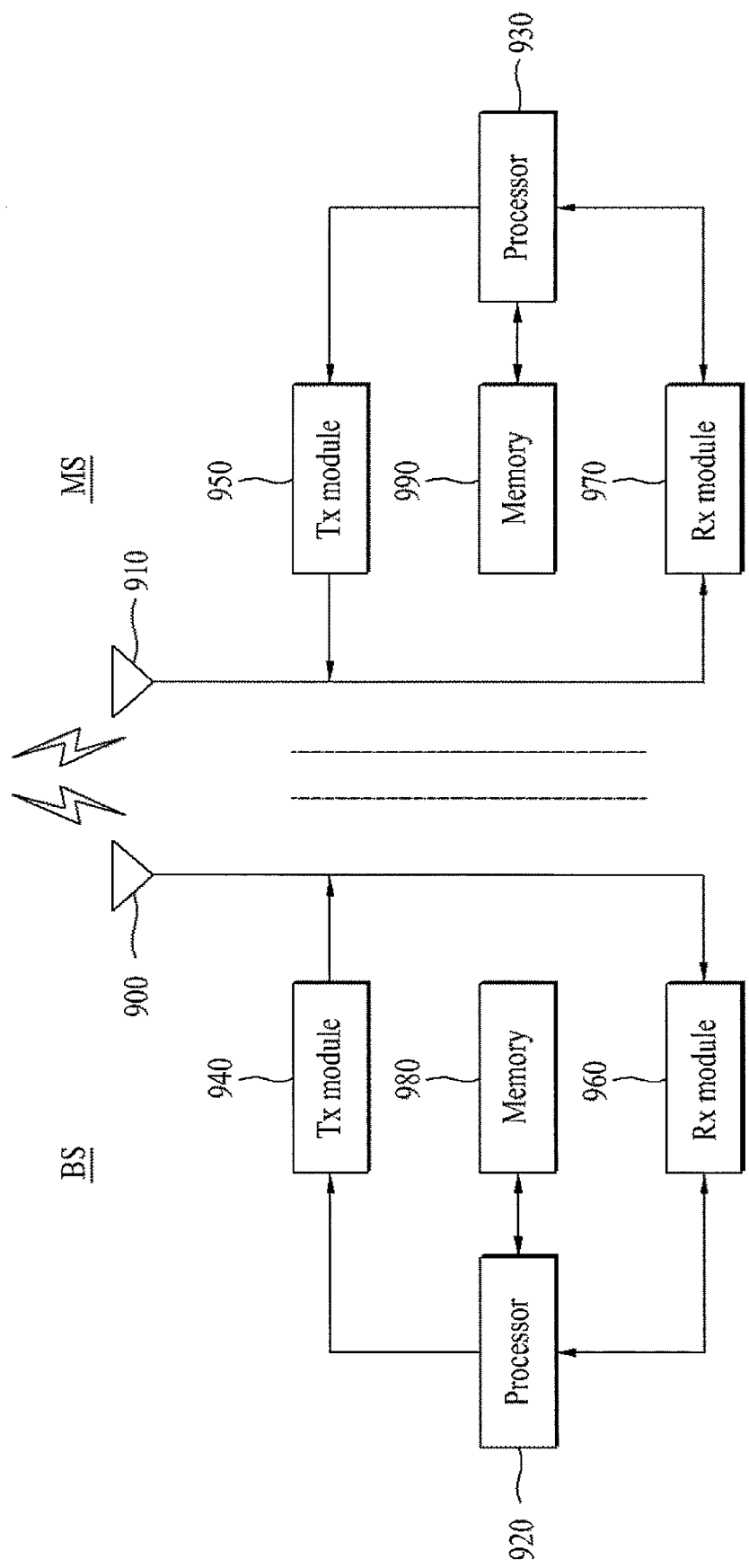
FIG. 9 is a block diagram of an Advanced Mobile Station (AMS) and an Advanced Base Station (ABS) for implementing the above embodiments of the present invention, according to an embodiment of the present invention.

FIG. 9 is a block diagram of an AMS and an ABS for implementing the above embodiments of the present invention, according to an embodiment of the present invention.

Referring to FIG. 9, the ABS and the AMS include antennas 900 and 910 for transmitting and receiving information, data, signals and/or messages, Transmission (Tx) modules 940 and 950 for transmitting messages by controlling the antennas 900 and 910, Reception (Rx) modules 960 and 970 for receiving messages by controlling the antennas 900 and 910, memories 980 and 990 for storing information related to communication with the AMS and the ABS, and processors 920 and 930 for controlling the Tx modules 940 and 950, the Rx modules 960 and 970, and the memories 980 and 990. Herein, the ABS may be a femto BS or a macro BS.

The antennas 900 and 910 transmit signals generated from the Tx modules 940 and 950 over the air or transmit signals received over the air to the Rx modules 960 and 970. When Multiple Input Multiple Output (MIMO) is supported, each of the AMS and the ABS may have two or more antennas.

In general, the processors 920 and 930 provide overall control to the ABS and the AMS. Particularly, the processors 920 and 930 may perform a control function, a Medium Access Control (MAC) frame conversion control function according to service characteristics and a propagation environment, a handover function, and an authentication and encryption function in order to perform the above-described embodiments of the present invention. In addition, each of the processors 920 and 930 may further include an encryption module for controlling encryption of various messages and a timer module for controlling transmission and reception of various messages.

The processor 920 of the ABS generates information indicating whether each uplink CC is used to transmit control information. This information may be cell-specific or AMS-specific.

A CC used for transmission of control information in another co-located network is determined not to be used for transmission of control information.

The Tx modules 940 and 950 may encode and modulate a signal and/or data scheduled by the processors 920 and 930 in a predetermined MCS and transmit the modulated signal and/or data to the antennas 900 and 910.

The Tx module 940 of the ABS transmits the information indicating whether each uplink CC is used for transmission of control information to the AMS.

The Tx module 950 of the AMS transmits uplink control information to the ABS on a CC used for transmission of control information based on the received information.

The Rx modules 960 and 970 may recover original data by decoding and demodulating radio signals received through the antennas 900 and 910 and may transmit the original data to the processors 920 and 930.

The Rx module 970 of the AMS receives the information indicating whether each uplink CC is used for transmission of control information from the ABS.

The Rx module 960 of the ABS receives the control information on the CC used for transmission of control information from the AMS. The Rx module 960 of the ABS may receive UCI piggybacked to a PUSCH of a CC used for transmission of control information and may receive a PRACH on a CC used for transmission of control information.

The memories 980 and 990 may store programs for processing and controlling in the processors 920 and 930 and temporarily store input/output data (an uplink grant allocated by an ABS, system information, a Station Identifier (STID), a Flow ID (FID), an action time, resource allocation information, and frame offset information in the memory 990 of the AMS).

Also, each of the memories 980 and 990 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Static RAM (SRAM), a Read-Only Memory (ROM), an Electrically Erasable Programmable Read-Only Memory (EEPROM), a Programmable Read-Only Memory (PROM), a magnetic memory, a magnetic disc, and optical disk.

Various embodiments have been described in the best mode for carrying out the invention.

The present invention is applicable to a wireless communication system. More particularly, the present invention is applicable to a method and apparatus for mitigating interference in a wireless communication system supporting heterogeneous networks.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. For instance, an embodiment of the present invention may be constructed by combining parts of the above-described embodiments.

The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

What is claimed is:

1. A method for receiving signals by a base station (BS) in a wireless communication system supporting a plurality of component carriers (CCs) including a first CC and a second CC, the method comprising:
    receiving a first physical uplink control channel (PUCCH) including first uplink control information from a first user equipment (UE);
    receiving a first physical random access channel (PRACH) from the first UE;
    receiving a second PUCCH including second uplink control information from a second UE; and
    receiving a second PRACH from the second UE,
    wherein the first and second UEs are configured with the plurality of CCs,
    wherein the first PUCCH is carried only on the first CC from among the plurality of CCs, and the first PRACH from the first UE is carried on the first CC on which the first PUCCH is carried,
    wherein the second PUCCH is carried only on the second CC from among the plurality of CCs, and the second PRACH from the second UE is carried on the second CC on which the second PUCCH is carried,
    wherein the first PUCCH from the first UE is not carried on any CC other than the first CC from among the plurality of CCs, and the second PUCCH from the second UE is not carried on any CC other than the second CC from among the plurality of CCs, and the first and second PRACHs from the first and second UEs, respectively, are not carried on any CC other than a CC among the plurality of CCs on which a PUCCH is carried, and
    wherein the first CC is different from the second CC.

2. The method according to claim 1, wherein the first uplink control information is further received via a physical uplink shared channel (PUSCH) on the first CC.

3. A method for transmitting signals by a first user equipment (UE) in a wireless communication system supporting a plurality of component carriers (CCs) including a first CC and a second CC, the method comprising:
    transmitting a first physical uplink control channel (PUCCH) including uplink control information to a base station (BS); and
    transmitting a first physical random access channel (PRACH) to the BS,
    wherein the first PUCCH is carried only on the first CC from among the plurality of CCs and the first PRACH from the first UE is carried on the first CC on which the first PUCCH is carried,
    wherein a second PUCCH transmitted by a second UE is carried only on the second CC from among the plurality of CCs, and a second PRACH transmitted from the second UE is carried on the second CC on which the second PUCCH is carried,
    wherein the first PUCCH from the first UE is not carried on any CC other than the first CC from among the plurality of CCs, and the second PUCCH from the second UE is not carried on any CC other than the second CC from among the plurality of CCs, and the first and second PRACHs from the first and second UEs, respectively, are not carried on any CC other than a CC among the plurality of CCs on which a PUCCH is carried, wherein the first and second UEs are configured with the plurality of CCs, and wherein the first CC is different from the second CC.

4. The method according to claim 3, wherein the uplink control information is further transmitted via a physical uplink shared channel (PUSCH) on the first CC.

5. A base station (BS) configured to operate in a wireless communication system supporting a plurality of component carriers (CCs) including a first CC and a second CC, the BS comprising:

a reception module; and a processor configured to:

receive a first physical uplink control channel (PUCCH) including first uplink control information from a first user equipment (UE) through the reception module, receive a first physical random access channel (PRACH) from the first UE through the reception module, receive a second PUCCH including second uplink control information from a second UE through the reception module, and receive a second PRACH from the second UE through the reception module, wherein the first and second UEs are configured with the plurality of CCs, wherein the first PUCCH is carried only on the first CC from among the plurality of CCs and the first PRACH from the first UE is carried on the first CC on which the first PUCCH is carried, wherein the second PUCCH is carried only on the second CC from among the plurality of CCs, the second PRACH from the second UE is carried on the second CC on which the second PUCCH is carried, wherein the first PUCCH from the first UE is not carried on any CC other than the first CC from among the plurality of CCs, and the second PUCCH from the second UE is not carried on any CC other than the second CC from among the plurality of CCs, and the first and second PRACHs from the first and second UEs, respectively, are not carried on any CC other than a CC among the plurality of CCs on which a PUCCH is carried, and wherein the first CC is different from the second CC.

6. The BS according to claim 5, wherein the first uplink control information is further received via a physical uplink shared channel (PUSCH) on the first CC through the reception module.

7. A user equipment (UE) configured to operate in a wireless communication system supporting a plurality of component carriers (CCs) including a first CC and a second CC, the UE comprising:

a transmission module; and a processor configured to:

transmit a first physical uplink control channel (PUCCH) including uplink control information to a base station (BS) through the transmission module, and transmit a first physical random access channel (PRACH) to the BS through the transmission module, wherein the first PUCCH is carried only on the first CC from among the plurality of CCs, and the first PRACH from the UE is carried on the first CC on which the first PUCCH is carried, wherein a second PUCCH transmitted by another UE is carried only on the second CC from among the plurality of CCs and a second PRAM transmitted from the another UE is carried on the second CC on which the second PUCCH is carried, wherein the first PUCCH from the first UE is not carried on any CC other than the first CC from among the plurality of CCs, and the second PUCCH from the second UE is not carried on any CC other than the second CC from among the plurality of CCs, and the first and second PRACHs from the first and second UEs, respectively, are not carried on an CC other than a CC among the plurality of CCs on which a PUCCH is carried, wherein the UEs are configured with the plurality of CCs, and wherein the first CC is different from the second CC.

8. The UE according to claim 7, wherein the uplink control information is further transmitted via a physical uplink shared channel (PUSCH) on the first CC through the transmission module.

* * * * *